United States Patent
Kokot, Jr. et al.

(10) Patent No.: US 8,567,299 B2
(45) Date of Patent: Oct. 29, 2013

(54) PRESSURIZED FLUID DELIVERY SYSTEM AND METHOD OF USE

(75) Inventors: Ralph Kokot, Jr., Schererville, IN (US); Mark Alan Firnhaber, Michigan City, IN (US); Daniel Matthew Ramirez, Portage, IN (US); Terry Wayne Vittatoe, Michigan City, IN (US)

(73) Assignee: Vanair Manufacturing, Inc., Michigan City, IN (US)

( * ) Notice: Subject to any disclaimer, the term of this patent is extended or adjusted under 35 U.S.C. 154(b) by 63 days.

(21) Appl. No.: 13/302,637

(22) Filed: Nov. 22, 2011

(65) Prior Publication Data

US 2012/0241016 A1 Sep. 27, 2012

Related U.S. Application Data

(60) Provisional application No. 61/416,004, filed on Nov. 22, 2010.

(51) Int. Cl.
*B63G 7/02* (2006.01)

(52) U.S. Cl.
USPC ............. 89/1.13; 102/402; 137/206; 137/14; 137/899.4

(58) Field of Classification Search
USPC ............ 89/1.13; 102/301, 402, 403; 137/206, 137/209, 14, 599.01, 899, 899.4
See application file for complete search history.

(56) References Cited

U.S. PATENT DOCUMENTS

| | | | |
|---|---|---|---|
| 1,567,448 A | 12/1925 | Minor | |
| 1,979,407 A | 11/1934 | Pike | |
| 2,132,132 A | 10/1938 | Seat | |
| 2,318,066 A | 5/1943 | Dodd | |
| 3,626,970 A | 12/1971 | Jones et al. | |
| 3,788,343 A * | 1/1974 | Neidorf et al. | 137/209 |
| 3,977,474 A | 8/1976 | Boegli | |
| 4,008,644 A * | 2/1977 | Kayser | 89/1.13 |
| 4,576,552 A | 3/1986 | Smith | |
| 4,707,952 A * | 11/1987 | Krasnoff | 451/75 |
| 5,205,316 A | 4/1993 | Pruett | |
| 5,218,986 A | 6/1993 | Farwell | |
| 5,868,280 A | 2/1999 | Schroeder | |
| 5,869,967 A * | 2/1999 | Straus | 324/326 |
| 5,988,037 A * | 11/1999 | Haughom et al. | 89/1.13 |
| 6,116,260 A * | 9/2000 | Nakagawa et al. | 137/14 |
| 6,200,104 B1 | 3/2001 | Park | |
| 6,280,302 B1 * | 8/2001 | Hashish et al. | 451/102 |
| 6,584,908 B2 | 7/2003 | Alford | |
| 6,681,675 B2 * | 1/2004 | Miller | 86/50 |
| 6,971,399 B2 | 12/2005 | Cowan | |
| 7,044,152 B2 * | 5/2006 | Scalzi et al. | 137/208 |
| 7,162,943 B1 * | 1/2007 | Reitmeyer et al. | 89/1.13 |
| 7,328,643 B2 * | 2/2008 | Goetsch et al. | 86/50 |
| 7,600,460 B2 * | 10/2009 | Manders | 89/1.13 |

(Continued)

*Primary Examiner* — Bret Hayes
*Assistant Examiner* — Joshua Freeman
(74) *Attorney, Agent, or Firm* — Hartman Global IP Law; Gary M. Hartman; Domenica N. S. Hartman

(57) ABSTRACT

A pressurized fluid delivery system and method that can be used to interrogate objects, such as the interrogation and detonation of IEDs. The system and method entail pressurizing a liquid within a vessel with a compressed gas source so that the liquid within the vessel is at a pressure above atmospheric pressure. The pressurized liquid, the compressed gas, or a mixture thereof is then selectively delivered to an outlet, and then discharged from the outlet to physically interrogate the object.

12 Claims, 2 Drawing Sheets

(56) References Cited

U.S. PATENT DOCUMENTS

| | | |
|---|---|---|
| 7,987,760 B1 * | 8/2011 | Lundquist et al. ............ 89/1.13 |
| 2001/0011556 A1 * | 8/2001 | Butler ..................... 137/565.29 |
| 2005/0081706 A1 | 4/2005 | Alford |
| 2006/0037462 A1 * | 2/2006 | Marcolla ....................... 89/1.13 |
| 2006/0048817 A1 * | 3/2006 | Laws et al. ................... 137/209 |
| 2008/0011152 A1 | 1/2008 | Weiss |
| 2008/0134870 A1 | 6/2008 | Goldman et al. |
| 2009/0064544 A1 * | 3/2009 | Rajewski ....................... 37/403 |
| 2009/0223355 A1 * | 9/2009 | Manders ....................... 89/1.13 |
| 2010/0288623 A1 * | 11/2010 | Tsegelsky ....................... 203/23 |
| 2011/0048217 A1 * | 3/2011 | Ulrich et al. .................. 89/1.13 |
| 2011/0120290 A1 | 5/2011 | Bitar et al. |
| 2011/0259181 A1 * | 10/2011 | Lundquist et al. ............ 89/1.13 |
| 2012/0125182 A1 * | 5/2012 | Lundquist et al. ............ 89/1.13 |
| 2012/0210854 A1 * | 8/2012 | Bitar et al. .................... 89/1.13 |

* cited by examiner

PRESSURIZED FLUID DELIVERY SYSTEM AND METHOD OF USE

CROSS REFERENCE TO RELATED APPLICATIONS

This application claims the benefit of U.S. Provisional Application No. 61/416,004, filed Nov. 22, 2010, the contents of which are incorporated herein by reference.

BACKGROUND OF THE INVENTION

The present invention generally relates to systems and methods that make use of pressurized gases and liquids. More particularly, the present invention relates to pressurized fluid delivery systems and methods that use pressurized fluid to physically interrogate objects, a particularly notable example of which are buried improvised explosive devices (IEDs).

Improvised explosive devices (IED) are explosive devices that are typically constructed of scavenged components and used for anti-personnel and anti-vehicle activities. Because of their makeshift construction, IEDs can vary widely in their size, shape and detonation system. As such, IEDs can be configured to be detonated by an electrical signal or as a result of being subjected to vibration or force. Various techniques have been proposed to disrupt IEDs, including electronic jamming systems, high voltage discharges, lasers, projectiles, kinetic energy vibrations, water jets, and mechanical arms and rollers. Mine-protected vehicles (MPVs) have been developed to protect personnel, as well as serve as vehicles specifically adapted to disrupt IEDs. A particular example is the BUFFALO®, which is a type of mine-resistant ambush protected (MRAP) vehicle built by Force Protection, Inc. In addition to being capable of withstanding bomb blasts, the BUFFALO® is equipped with a robotic arm or crane that can be used to examine and remove IEDs.

While the various techniques that have been used to disrupt IEDs have proven to be generally effective, further improvements are still desired. One such example relates to the use of water to interrogate IEDs. When used for this purpose, the effectiveness of a water jet depends on its velocity and volumetric flow rate. However, the flow outputs of typical centrifugal-type water pumps decrease significantly as the output pressure increases. Though constant displacement pumps can be configured to have both high output flow rates and pressures, they are limited to a single output flow rate at a single output pressure, which significantly limits the versatility of the water jet when attempting to excavate and interrogate an IED.

BRIEF DESCRIPTION OF THE INVENTION

The present invention provides a pressurized fluid delivery system and method that can be used to interrogate objects, such as the interrogation and detonation of IEDs, and has multiple operating modes in which a gas and/or liquid may be used as the interrogation media.

According to a first aspect of the invention, the pressurized fluid delivery system includes a vessel configured to contain a fluid under pressure. A liquid source is fluidically connected to the vessel for supplying a liquid to the vessel. A compressed gas source is also fluidically connected to the vessel and is adapted to supply a compressed gas to the vessel and pressurize the liquid within the vessel to a pressure above atmospheric pressure. An outlet is fluidically connected to the vessel and is separately fluidically connected to the compressed gas source. A first valve means controls the flow of the liquid from the vessel to the outlet, a second valve means controls the flow of the compressed gas from the compressed gas source to the outlet, and a third valve means controls the flow of the compressed gas from the compressed gas source to the vessel. The first and second valve means are adapted to be operated to selectively deliver the liquid, the compressed gas, or a mixture thereof to the outlet.

Another aspect of the invention is method of using a pressurized fluid delivery system comprising the elements described above to physically interrogate an object. Such a method includes delivering the liquid from the liquid source to the vessel, delivering the compressed gas from the compressed gas source to the vessel to thereby pressurize the liquid within the vessel to a pressure above atmospheric pressure, operating the first and second valve means to selectively deliver the liquid, the compressed gas, or a mixture thereof to the outlet, and then discharging the liquid, the compressed gas, or the mixture thereof from the outlet to physically interrogate the object.

According to another aspect of the invention, a method of using pressurized fluid to physically interrogate an object includes pressurizing a liquid within a vessel with a compressed gas source so that the liquid within the vessel is at a pressure above atmospheric pressure, selectively delivering the pressurized liquid, the compressed gas, or a mixture thereof to an outlet, and then discharging the pressurized liquid, the compressed gas, or a mixture thereof from the outlet to physically interrogate the object with the pressurized liquid, the compressed gas, or the mixture thereof.

A technical effect of the invention is the ability to selectively use a pressurized liquid, a compressed gas, or a mixture thereof as the excavation media for physically interrogating a buried object, such as an IED. A pressurized liquid (such as water) is beneficial for softening and penetrating hard dry soil, and is also effective for buoying and jetting away the softened soil from around a buried object. Thereafter, the system can switch to using the compressed gas or liquid-gas mixture as the excavation media to blow the liquid that has accumulated within the excavated hole.

Other aspects and advantages of this invention will be better appreciated from the following detailed description.

DETAILED DESCRIPTION OF THE INVENTION

Figure 1:
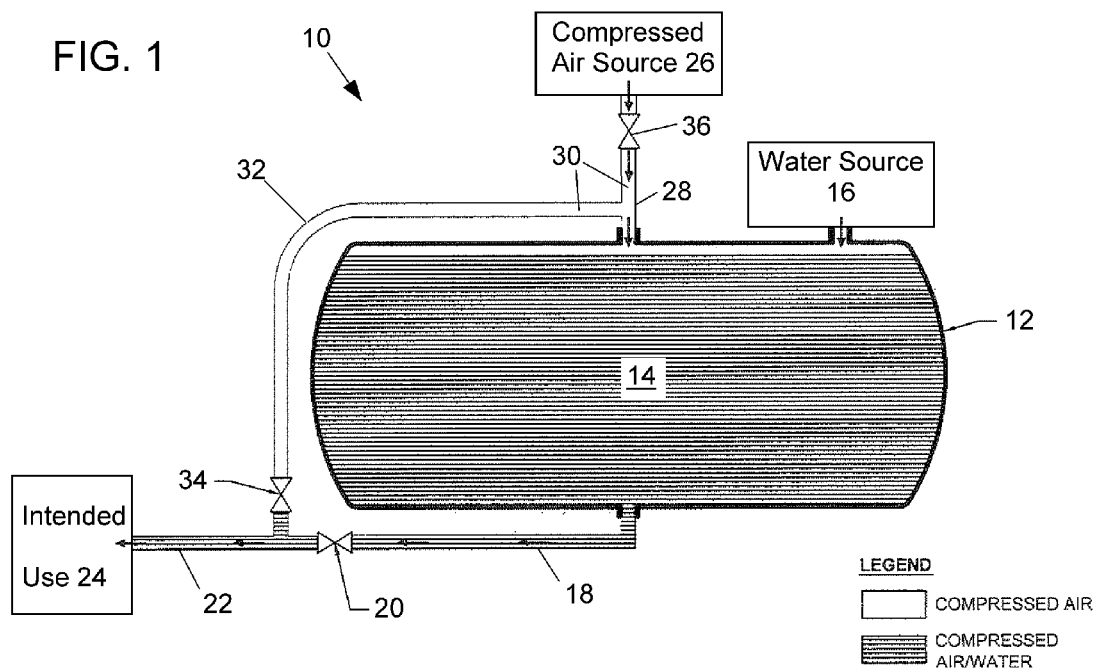
FIGS. 1 and 2 schematically represent all-fluid and all-pneumatic operating modes, respectively, for a pressurized fluid delivery system in accordance with an embodiment of this invention.
Figure 2:
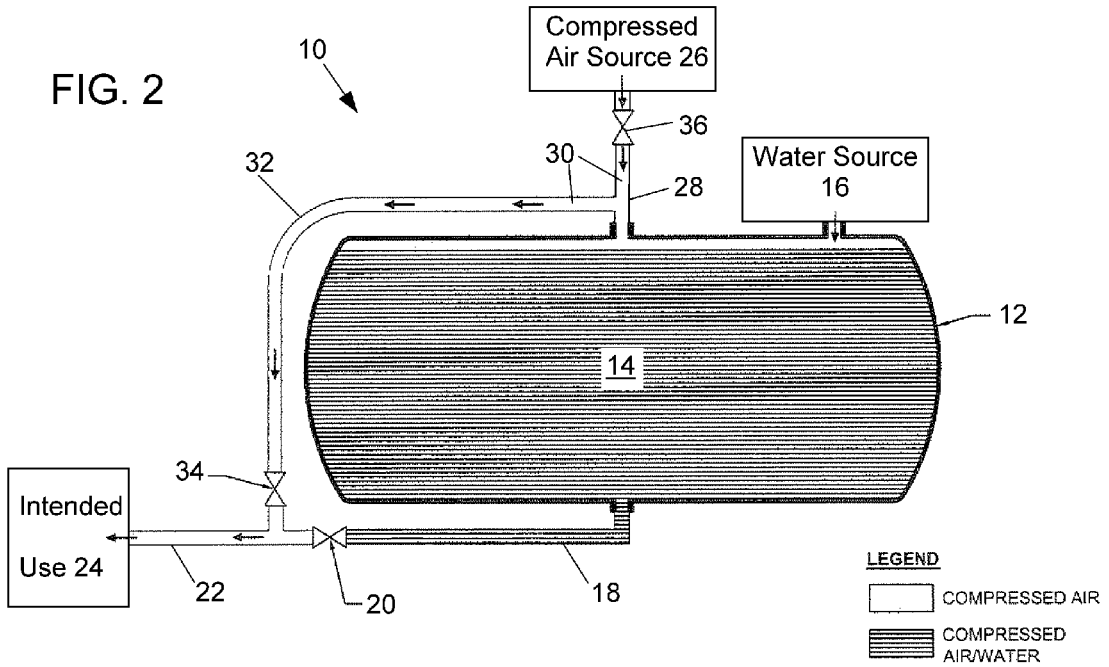

FIGS. 1 and 2 schematically represent two operating modes of a pressurized fluid delivery system 10 of the present invention. In FIG. 1, an all-fluid operating mode is represented, meaning that the fluid delivered by the system 10 does not intentionally contain any gasses. FIG. 2 represents an all-gas operating mode, meaning that the fluid delivered by the system 10 does not intentionally contain any liquids. As will become apparent from the following discussion, another possible operating mode involves the delivery of both liquid and gas.

FIGS. 1 and 2 represent the fluid delivery system 10 as including a pressure vessel 12 filled with a liquid 14, a non-limiting example of which is water. The vessel 12 includes an inlet through which the liquid 14 enters the vessel 12 from a suitable source 16, and a liquid outlet line 18 connected to a valve 20, through which the liquid 14 is able to exit the vessel 12 and flow into a system outlet 22 before arriving at its intended use 24. The system 10 is further shown as including a compressed gas source 26 connected to the vessel 12 with a gas inlet line 28 through which a compressed gas 30 enters the vessel 12 to pressurize its contents at a pressure above atmospheric pressure. The gas inlet line 28 is also connected by a gas by pass line 32 to a valve 34, through which the gas 30 is able to flow into the system outlet 22 before arriving at its intended use 24. Other components that might be conventionally included in a pressurized fluid system, for example, pressure relief valves and pressure regulators, are not shown but can be incorporated into the system 10 in any suitable manner known in the art.

According to a preferred aspect of the invention, the compressed gas source 26 continuously supplies the vessel 12 with the compressed gas 30, so that the source 26 compensates for any pressure drop that would result from the discharge of a quantity of the liquid 14 from the vessel 12, so that the contents of the vessel 12 are continuously maintained at a desired pressure. The compressed gas source 26 is also preferably capable of continuously supplying the compressed gas 30 to the gas inlet line 28 and gas bypass line 32 so that any drop in pressure that would result from a quantity of the gas 30 being discharged from the bypass line through the system outlet 22 will be compensated for. Because the pressure within the vessel 12 is dependent on the pressure of the compressed gas 30, the pressure of the pressurized liquid 14 within the vessel 12 and at the valve 20 and the pressure of the compressed gas 30 within the gas bypass line 32 and at the valve 34 can be the very same (absent any devices for reducing pressures).

The valves 20 and 34 are preferably controlled with a suitable control system (not shown) to enable the pressurized liquid 14 (FIG. 1) or compressed gas 30 (FIG. 2) to be discharged from the system 10 at a controlled rate through the system outlet 22. Because the pressures of liquid 14 and gas 30 can be the very same at the valves 20 and 34, the valves 20 and 34 can also be controlled to deliver the liquid 14 and gas 30 to the system outlet 22 in amounts that will produce a desired liquid-gas mixture (for example, a mist).

The pressurized fluid delivery system 10 represented in FIGS. 1 and 2 can be used to deliver the pressurized liquid 14 and/or compressed gas 30 for a wide variety of intended uses 24. As nonlimiting examples, the system 10 can be used in fire fighting applications, compressed air foam system delivery and installation applications, irrigation systems, wash down equipment, decontamination applications, and IED interrogation. In the case of IED interrogation, the valves 20 and 34 can be controlled to enable the system 10 to use air (and/or another suitable gas), water (and/or another suitable liquid), and mixtures thereof (for example, a mist) as excavation media. The ability to use any combination of compressed gas 30 and pressurized liquid 14 increases the versatility of excavation applications. The system 10 is well suited for mobile applications in which compressed air is available, such as on utility, service, emergency and military vehicles equipped with on-board air compressors that may be powered by, for example, a power takeoff (PTO) shaft driven by the engine of the vehicle. As with other fluid systems that deliver and contain a fluid at a high pressure or flow rate, the outputs of such air compressors are often regulated at a prescribed level deemed safe and appropriate for the intended use of the compressed air. The system 10 of this invention is able to utilize a continuous supply of compressed air from an air compressor (source 26) to pressurize the contents of the vessel 12, so that the compressed air 30 is able to force the contents of the vessel 12 into the liquid outlet line 18 of the vessel 12. In the case of a PTO-powered air compressor, the air compressor begins to build air pressure when a user activates the PTO on the vehicle while a valve 36 is closed. By opening the valve 36, the user is able to activate the system 10 and build pressure within in the vessel 12.

As previously noted, a technical effect of the system 10 is the ability to selectively use the pressurized liquid 14, the compressed gas 30, or a mixture thereof as the excavation media for physically interrogating a buried object, such as an IED. The ability to switch between the pressurized liquid 14 and compressed gas 30 allows a user to first employ the pressurized liquid 14 to soften and penetrate a hard dry soil and then buoy and jet away the softened soil from around a buried object. The system 10 can then be switched to use the compressed gas 30 or a liquid-gas mixture as the excavation media to blow the liquid 14 that has accumulated within the excavated hole. In addition to this operational benefit of being able to selectively use the pressurized liquid 14 and/or compressed gas 30, the system 10 also benefits from the manner in which the compressed gas 30 is used to pressurize the liquid 14 within the vessel 12. The effectiveness of the liquid 14 when excavating a buried object is dependent on the velocity and volumetric flow rate of the liquid 14. For example, when discharged into atmospheric conditions, the velocity and flow rate of water at a pressure of about 175 psig (about 12 bar) are about 50% greater than water at a pressure of about 75 psig (about 5 bar), thus generally increasing the excavation effectiveness by about 50%. For typical centrifugal type water pumps, water flow output decreases significantly as pressure rises, thus limiting their ability to continuously deliver water at an adequate pressure and flow rate for interrogation and excavation purposes. In contrast, in the system 10 represented in FIGS. 1 and 2, as the pressure within the vessel 12 is increased, discharge flow of the liquid 14 from the vessel 12 also increases as long as the capacity of the compressed gas source 26 to deliver compressed gas 30 to the vessel 12 is greater than the capacity of the vessel 12 to deliver the liquid 14 to the output 22. In addition, whereas constant displacement pumps operate to have a single output flow rate and pressure, the pressure of the compressed gas 30 deceived to the vessel 12 can be readily changed to change the pressure and flow rate of the liquid 14 from the vessel 12.

Figure 3:
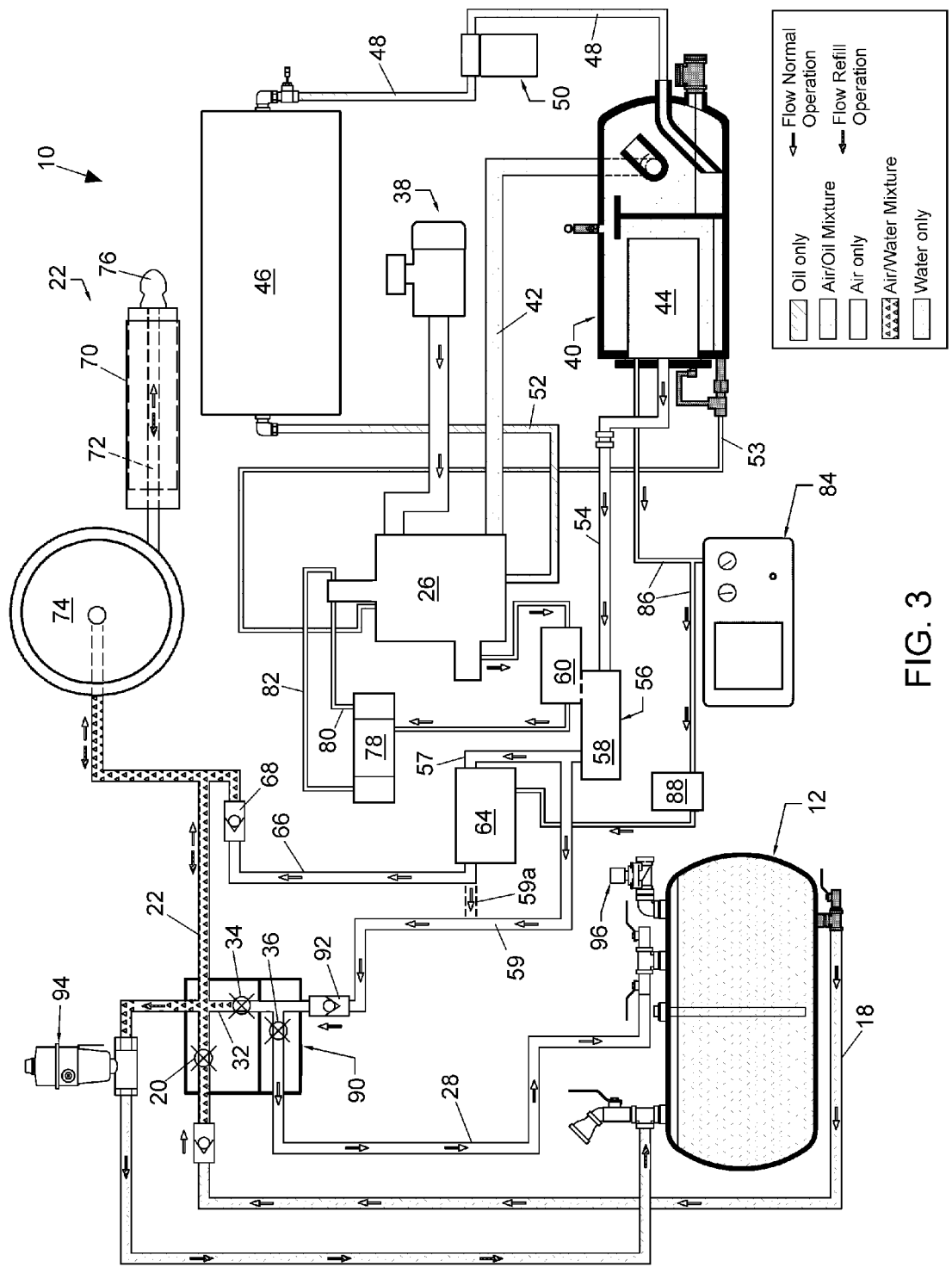
FIG. 3 schematically represent a pressurized liquid-gas delivery system in accordance with a preferred embodiment of the invention.

FIG. 3 schematically represents a particular embodiment of the pressurized fluid delivery system 10 of FIGS. 1 and 2, and is represented as being implemented with additional components for use as an IED interrogator. The various components of the system 10 are summarized below.

Air for use as the compressed gas 30 of the system 10 is drawn through a filter 38, for example, a single-stage filter designed to remove dirt and debris from air prior to its entry into a compressor unit, corresponding to the compressed gas source 26 in FIGS. 1 and 2. The compressor unit 26 can make use of various types of compressors, for example, a single-stage, positive-displacement, oil-flooded, rotary screw type design, in which case the output of the compressor unit 26 is a mixture of pressurized air and oil. As is generally known in the art, the compressor unit 26 may further comprise a check valve (not shown) that prevents the air/oil mixture from flowing backward to pressure regulators during shutdown, and an inlet valve (not shown) that modulates the amount of air compressed by the compressor unit 26.

The compressor unit 26 is connected to a receiver tank 40 via a discharge hose 42. The receiver tank 40 receives the pressurized air/oil mixture from the compressor unit 26, and allows the bulk of the oil within the mixture to drop out, after which finer oil particles are separated from the compressed air, for example, using an internal coalescing element 44 of a type known in the art. The receiver tank 40 then recycles oil to an oil cooler unit 46 through an oil line 48 that includes an oil filter 50. The oil cooler unit 46 preferably includes an air-to-oil heat exchanger that maintains the oil within a desired temperature range. The cooled oil is then returned to the air compressor unit 26 via an oil return line 52. A scavenger hose 53 allows air and oil accumulated by the coalescing element 44 of the receiver tank 40 to flow to the vacuum side of the compressor unit 26.

From the receiver tank 40, the resulting compressed air 30 passes through an air line 54 to a minimum pressure valve/blowdown valve assembly 56, which in preferred embodiments of the invention comprises a minimum pressure valve 58 plumbed to a blowdown valve 60. The minimum pressure valve 58 is configured to ensure that a minimum upstream pressure is maintained before air is allowed to pass downstream. When the system 10 is shut down, the blowdown valve 60 relieves the pressure in the system 10 upstream of the minimum pressure valve 58. Air pressure from the compressor unit 26 is transmitted through a blowdown pilot hose 62 to the pilot side of the blowdown valve 60, which upon shutdown of the system 10 opens the valve 60 to relieve pressure from the system 10 by allowing air to blow out of an orifice on the valve 60.

As seen in FIG. 3, the minimum pressure valve/blowdown valve assembly 56 is also connected with an air hose to a dual pressure regulator assembly 78, which sets the maximum operating pressure for the compressed gas 30 within the system 10. The regulator assembly 78 functions to allow air pressure to pass downstream when a given pressure is reached, and is preferably adjustable to pass air at different pressures, for example, 100 psig and 175 psig (about 7 to about 12 bar). The regulator assembly 78 may include one or more pressure regulators, in which case the regulators are connected through a solenoid valve (not shown) that determines which of the individual pressure regulators is used. FIG. 3 represents the situation in which the regulator assembly 78 includes two regulators whose outputs are connected through separate air hoses 80 and 82 to the compressor unit 26 for the purpose of setting the maximum operating pressure for the compressed gas 30 within the system 10 by pneumatically modulating the flow of air through the inlet valve to compressor of the compressor unit 26.

The minimum pressure valve/blowdown valve assembly 56 is further connected with an air line 57 to a pilot valve and solenoid valve assembly 64, which serves as an adjustable pressure regulator for the compressed gas 30 delivered to the vessel 12. The pilot valve and solenoid valve assembly 64 preferably includes a piloted regulator valve, a solenoid valve, and piping that connects the two. In preferred embodiments of the system 10, the pilot valve is a 1:1 piloted regulator valve, and the pressure supplied to the pilot port of the pilot valve is the same pressure that the valve allows to pass downstream. The pilot valve and solenoid valve assembly 64 is connected by a hose 66 to a check valve 68 that is located downstream of the assembly 64 to prevent backward flow from a hose reel unit (corresponding to the system outlet 22 in FIGS. 1 and 2), through which the interrogation media (corresponding to the pressurized liquid 14 and/or compressed air 30) flows during an interrogation operation performed by the system 10. In the case of a vehicle equipped with an extendable robotic arm or crane 70, for example, of a type provided on the BUFFALO® MRAP previously discussed, the hose reel unit 22 allows a hose 72 to be extended from and retracted onto a hose reel 74, depending on the deployment of the crane 70. As represented in FIG. 3, the hose 72 terminates with a nozzle 76, which may be of a specially designed type that has specific holes or orifices to generate a stream of water and/or air that is conducive to IED excavation.

An instrument panel assembly 84 is connected via a hose 86 to the compressed air within the receiver tank 40. The panel assembly 84 preferably includes a pressure switch-gauge, a temperature switch-gauge, and a reset switch. The pressure switch-gauge monitors pressure within the receiver tank 40, and also acts as an over-pressure switch that shuts down the system 10 in the event that the pressure rises above a predetermined level. The temperature switch-gauge monitors the oil temperature within the receiver tank 40 and also acts as an over-temperature switch that shuts down the system 10 in the event that the oil temperature rises above a predetermined level. The reset switch can be a spring-latched pushbutton that can be reset in the event that an over-pressure or over-temperature shutdown condition occurs. In FIG. 3, the same hose 86 that connects the receiver tank 40 to the panel assembly 84 also connects the receiver tank 40 to an electronic pressure regulator 88 that controls air pressure delivered to the pilot valve and solenoid valve assembly 64.

The line 57 that connects the minimum pressure valve/blowdown valve assembly 56 to the pilot valve and solenoid valve assembly 64 is shown in FIG. 3 as branching off to define another air line 59 that connects the minimum pressure valve/blowdown valve assembly 56 to a manifold block assembly 90 via a check valve 92. The manifold block assembly 90 is configured to control the flow of air, water, or an air-water mixture (mist) to the hose reel unit 22 and its nozzle 76. The manifold block assembly 90 is represented as including three valves, corresponding to the three valves 20, 34 and 36 of FIGS. 1 and 2. The valve 36 is a normally-closed two-way solenoid valve that allows the flow of compressed air from the compressor unit 26, through a hose (corresponding to the inlet line 28 in FIGS. 1 and 2), and into the vessel 12. The valve 20 is also a normally-closed two-way solenoid valve, and allows pressurized water to flow from the vessel 12 through a first hose (corresponding to the outlet line 18 in FIGS. 1 and 2), and then through a second hose (corresponding to the system outlet 22 in FIGS. 1 and 2) to the hose reel unit 22 and its nozzle 76. Finally, the valve 34 is a normally-open two-way solenoid valve that allows pressurized air to flow through a hose (corresponding to the bypass line 32 in FIGS. 1 and 2) and then through the system outlet 22 to the hose reel unit 22 and its nozzle 76. The normally-closed valve 36 is activated when a main switch (not shown) located on the instrument panel 84 is ON. The normally-closed valve 20 allows pressurized water to flow to the hose reel unit 22 and its nozzle 76 when a water-mode switch (not shown) located on the instrument panel 84 is ON. Finally, the normally-open valve 34 allows compressed air to flow to the hose reel unit 22 and its nozzle 76 when an air-mode switch (not shown) located on the instrument panel 84 is ON.

FIG. 3 represents an alternative to the connection between the minimum pressure valve/blowdown valve assembly 56 and the manifold block assembly 90. The alternative is represented as an air line 59a that connects the manifold block assembly 90 to the output of the pilot valve and solenoid valve assembly 64, instead of the manifold block assembly 90 being directly connected to the minimum pressure valve/blowdown valve assembly 56. With this variation, the vessel 12 is pressurized downstream of the valve assembly 64 through the line 59a, instead of upstream of the valve assembly 64 through the air line 59. With this variation, pressure in the vessel 12 can be adjusted with the valve assembly 64, providing a simple method for adjusting the pressure and flow of the liquid 14 to the hose reel unit 22. Such a capability would be particularly useful if, for example, the pressure within the vessel 12 and/or the flow rate of the liquid 14 were excessive for the intended use, for example, excavation of an IUD, in which case the valve assembly 64 can be used to reduce the pressure within the vessel 12 and potentially provide better control the flow rate and velocity of the liquid discharged through the hose reel unit 22.

The system 10 is also represented in FIG. 3 as including two electric ball valves 94 and 96 whose operations are controlled by a refill-mode switch (not shown) located on the instrument panel 84. The first ball valve 94 is connected to the manifold block assembly 90 and, when activated, allows water introduced into the system 10 by the hose reel unit 22 (which therefore is also capable of serving as the liquid source 16 in FIGS. 1 and 2) to flow through the manifold block assembly 90 and then to the vessel 12 during the refill mode. The second ball valve 96 is located on the vessel 12 and serves as a vent for the vessel 12 to relieve pressure during the refill mode. Other means for refilling the vessel 12 are foreseeable, including manually-activated ball valves and auxiliary connections to a water pump.

Finally, there is preferably a provision to bypass the system 10 in the event that the vessel 12 ruptures or otherwise cannot hold pressure. By selecting "Bypass" mode with the instrument panel 84, the manifold block assembly 90 is closed and the solenoid valve of the pilot valve and solenoid assembly 64 opens, allowing air to bypass the manifold block assembly 90 and exit the system through the hose reel unit 22.

While the invention has been described in terms of specific embodiments, it is apparent that other forms could be adopted by one skilled in the art. For example, the physical configuration of the system 10 could differ from that shown, and various components other than those noted could be used. Therefore, the scope of the invention is to be limited only by the following claims.

The invention claimed is:

1. A pressurized fluid delivery system adapted to use pressurized fluid to physically interrogate an object, the system comprising:
    a vessel configured to contain a fluid under pressure;
    a liquid source fluidically connected to the vessel for supplying a liquid to the vessel;
    a compressed gas source fluidically connected to the vessel and adapted to supply a compressed gas to the vessel and pressurize the liquid within the vessel to a pressure above atmospheric pressure;
    an outlet fluidically connected to the vessel and separately fluidically connected to the compressed gas source;
    a first valve means for controlling flow of the liquid from the vessel to the outlet;
    a second valve means for controlling flow of the compressed gas from the compressed gas source to the outlet;
    a third valve means for controlling flow of the compressed gas from the compressed gas source to the vessel; and
    means for operating the first and second valve means to selectively deliver the liquid, the compressed gas, or a mixture thereof to the outlet.

2. The pressurized fluid delivery system according to claim 1, wherein the outlet comprises a hose and nozzle.

3. The pressurized fluid delivery system according to claim 2, wherein the outlet is coupled to an extendable crane.

4. The pressurized fluid delivery system according to claim 3, wherein the extendable crane is coupled to a vehicle on which the pressurized fluid delivery system is mounted.

5. The pressurized fluid delivery system according to claim 1, wherein the compressed gas source is adapted to continuously supply the vessel with the compressed gas so as to compensate for any pressure drop that would result from the delivery of the liquid to the outlet so that the liquid within the vessel is continuously maintained at the pressure above atmospheric pressure.

6. The pressurized fluid delivery system according to claim 1, wherein the compressed gas and the liquid within the vessel are at the same pressure above atmospheric pressure.

7. A pressurized fluid delivery method of using the pressurized fluid delivery system of claim 1 to physically interrogate an object, the method comprising:
    delivering the liquid from the liquid source to the vessel;
    delivering the compressed gas from the compressed gas source to the vessel to thereby pressurize the liquid within the vessel to a pressure above atmospheric pressure;
    operating the first and second valve means to selectively deliver the liquid, the compressed gas, or a mixture thereof to the outlet; and
    discharging the liquid, the compressed gas, or the mixture thereof from the outlet to physically interrogate the object.

8. The pressurized fluid delivery method according to claim 7, wherein the first and second valve means are operated to selectively deliver only the liquid to the outlet and discharge only the liquid from the outlet to physically interrogate the object.

9. The pressurized fluid delivery method according to claim 7, wherein the first and second valve means are operated to selectively deliver only the compressed gas to the outlet and discharge only the compressed gas from the outlet to physically interrogate the object.

10. The pressurized fluid delivery method according to claim 7, wherein the first and second valve means are operated to selectively deliver the mixture of the liquid and the compressed gas to the outlet and discharge the mixture from the outlet to physically interrogate the object.

11. The pressurized fluid delivery method according to claim 10, wherein the mixture is a mist.

12. The pressurized fluid delivery method according to claim 7, wherein the object is a buried improvised explosive device.

* * * * *